US011301235B1

(12) United States Patent
Erdogan

(10) Patent No.: US 11,301,235 B1
(45) Date of Patent: Apr. 12, 2022

(54) APPLICATION DOWNTIME REDUCTION USING DETACHED MODE OPERATION DURING OPERATING SYSTEM UPDATES

(71) Applicant: Amazon Technologies, Inc., Seattle, WA (US)

(72) Inventor: Tahsin Erdogan, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 235 days.

(21) Appl. No.: 16/794,084

(22) Filed: Feb. 18, 2020

(51) Int. Cl.
*G06F 8/65* (2018.01)
*G06F 12/02* (2006.01)

(52) U.S. Cl.
CPC ............ *G06F 8/65* (2013.01); *G06F 12/0238* (2013.01)

(58) Field of Classification Search
USPC .......................................................... 717/168
See application file for complete search history.

(56) References Cited

U.S. PATENT DOCUMENTS

| 6,675,258 | B1* | 1/2004 | Bramhall | G06F 8/65 711/100 |
| 9,792,106 | B1* | 10/2017 | Kommula | H04L 41/082 |
| 2004/0122973 | A1* | 6/2004 | Keck | H04L 43/00 709/238 |
| 2008/0208365 | A1* | 8/2008 | Grgic | G05B 19/042 700/2 |
| 2010/0250908 | A1* | 9/2010 | Amann | G06F 8/656 713/1 |
| 2011/0022828 | A1* | 1/2011 | Delaney | G06F 8/656 713/2 |
| 2016/0092202 | A1* | 3/2016 | Filali-Adib | G06F 8/656 717/168 |
| 2016/0092203 | A1* | 3/2016 | Filali-Adib | G06F 8/656 717/171 |
| 2018/0032349 | A1* | 2/2018 | Bhimanadhuni | G06F 9/4406 |

OTHER PUBLICATIONS

K. Terada and H. Yamada; "Dwarf: Shortening Downtime of Reboot-Based Kernel Updates"; 12th European Dependable Computing Conference (EDCC) (pp. 208-217); 2016 (Year: 2016).*
M. Wahlerand M. Oriol, "Disruption-free Software Updates in Automation Systems"; Proceedings of the 2014 IEEE Emerging Technology and Factory Automation (ETFA) (pp. 1-8); 2014 (Year: 2014).*

(Continued)

*Primary Examiner* — Qing Chen
*Assistant Examiner* — Clint Thatcher
(74) *Attorney, Agent, or Firm* — Robert C. Kowert; Kowert, Hood, Munyon, Rankin & Goetzel, P.C.

(57) ABSTRACT

Prior to an update of an operating system of a computing device, a configuration operation is performed with respect to a particular processor of the computing device, such that the particular processor is indicated to the operating system as being in an offline state while an application runs at the particular processor. The operating system is then updated. The update comprises a time interval in which the operating system is unavailable and the application performs one or more computations at the particular processor. After the update, the application is restarted.

20 Claims, 10 Drawing Sheets

(56) References Cited

OTHER PUBLICATIONS

M. Siniavine and A. Goel; "Seamless Kernel Updates"; 43rd Annual IEEE/IFIP International Conference on Dependable Systems and Networks (DSN)(pp. 1-12); 2013 (Year: 2013).*
T. Nakajima et al.; "Temporal and Spatial Isolation in a Virtualization Layer for Multi-core Processor Based Information Appliances"; 16th Asia and South Pacific Design Automation Conference (ASP-DAC) (pp. 645-652); 2011 (Year: 2011).*
Cristiano Giuffrida, et al, "Safe and Automatic Live Update for Operating Systems", ACM, ASPLOS'13, Mar. 16-20, 2013, pp. 13.
Sebastian Andrzej Siewior, et al., "CPU hotplug in the Kernel", 2016, pp. 16.
Wikipedia, "Data Plane Development Kit", Retrieved from https://en.wikipedia.org/wiki/Data_Plane_Development_Kit on Jan. 17, 2020, pp. 5.
Wikipedia, "Dynamic software updating", Retrieved from https://en.wikipedia.org/wiki/Dynamic_software_updating on Jun. 18, 2016, pp. 9.
Thomas Petazzoni, "Device Tree for Dummies", Retrieved from https://events.linuxfoundation.org/sites/events/files/slides/petazzoni-device-tree-dummies, 2013, pp. 47.
ARM, "ARM Power State Coordination Interface—Platform Design Document", Copyright 2017 ARM, Document No. ARM DEN 0022D, pp. 105.
"Process Segments and VMA", Retrieved from venkateshabbarapu.blogspot.com/2012/09/process-segments-and-vma.html on Jan. 17, 2020, pp. 12.
Wikipedia, "User-Mode Driver Framework", Retrieved from https://en.wikipedia.org/wiki/User-Mode_Driver_Framework on Jan. 17, 2020, pp. 3.

* cited by examiner

APPLICATION DOWNTIME REDUCTION USING DETACHED MODE OPERATION DURING OPERATING SYSTEM UPDATES

BACKGROUND

More and more applications are being run at network-accessible services, for example in cloud-based environments in which hundreds of thousands of customers potentially have to be served concurrently while meeting stringent performance requirements. Often, clients run their applications on compute instances such as guest virtual machines established at multi-tenant compute servers of the network-accessible services, each of which may handle the workloads of numerous clients concurrently.

In order to support client applications at a network-accessible service, various types of management software may be executed at different layers of the underlying cloud infrastructure. Such management software may, for example, include virtualization management software components, which in turn may rely upon operating systems at least during some phases of operation. If the virtualization management software components at a given host become unresponsive or unavailable, some or all of the client applications running at the compute instances launched at the host may also not be able to function properly.

Typical operating system updates require reboots of the device at which the operating system is running, which forces applications (such as the virtualization management software components) that rely on the operating systems to exit. The application software is normally re-launched after the device is rebooted and the updated version of the operating system kernel starts up. The time interval for which a particular application is unavailable during the update process may vary, e.g., depending on factors such as the operating system versions, the type of hardware device at which the application runs, the total number of applications which have to be re-launched, the sequence in which the applications are re-launched, and so on.

Figure 1:
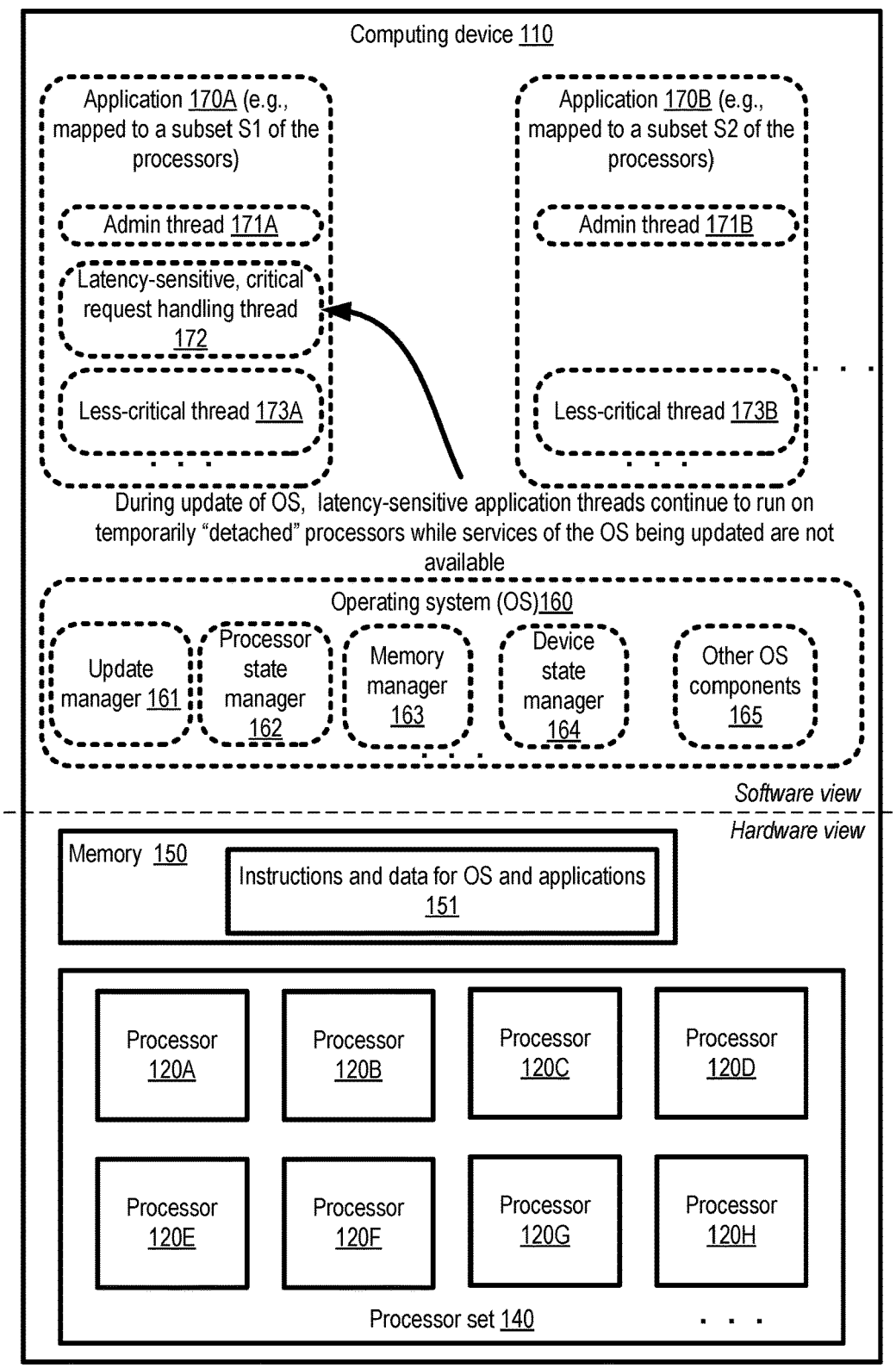
FIG. 1 illustrates an example system environment in which a technique involving the use of a detached mode of operation may be implemented to enable some types of application requests to continue to be processed at a computing device during updates of an operating system of the computing device, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for reducing the down-time of certain types of latency-sensitive applications during updates to the operating systems at the computing devices at which the applications are running, using techniques for logically isolating a subset of the system's resources such that the resources remain accessible to the critical applications during the update workflow. Generally speaking, an application may be termed "latency-sensitive" if it is intended to process requests from its users or clients rapidly and on a near-continuous basis, such that the application may be regarded as having failed its design goals if it is unable to respond to a request within a very short interval. The threshold length of the unresponsiveness interval may of course vary with the application and the computing capabilities of the environment in which it runs; in some cases, for example, the threshold interval may be a few milliseconds, while in other cases it may be some number of microseconds or some number of seconds. For example, in the context of a cloud provider network, certain virtualization-related applications may not be able to withstand a ~100 millisecond kernel update, such as a program implementing a virtualized network encapsulation protocol, or a program for virtualizing input and output (I/O) between virtualized resources.

Traditional updates of the operating system at the computing device at which a latency-sensitive application is run (e.g., including "live updates" in which the operating system automatically downloads a new version of itself when the new version becomes available, and boots from the new version) may potentially cause the responsiveness and latency targets of some latency-sensitive applications to be missed. This is because in the workflows or procedures associated with such traditional updates, the operating system usually prepares for its update by causing various applications to shut down, and the applications are only restarted after the operating system has itself been successfully updated and rebooted. Some latency-sensitive applications, or software threads of such applications, may be referred to as "real time" applications or threads. Processing events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms mean processing data as it is received as opposed to storing or persisting the data once received for processing later on.

Instead of following such a traditional approach, a mode of operation referred to as a "detached" mode may be supported for at least some applications (including latency-sensitive applications) in various embodiments. In effect, a given application may run in one of two modes at a given point in time at a computing device with multiple processors in such embodiments: a normal mode of operation, and a detached mode of operation. In the normal mode, all the functionality of the operating system being updated (some of which may be implemented at processors other than the processor(s) being used by the application) is accessible to the application if needed. In the detached mode, at least some of the functionality of the operating system is inaccessible to the application, but the application is nevertheless able to use a subset of resources of the computing device to perform at least some tasks on behalf of the application's clients or users. In various embodiments, one or more threads of a given application, running at a given processor of a computing device during normal mode operation, may enter a privileged or kernel mode and perform some operating system functions at that processor during some time periods. Other operating system tasks may be performed (at least partly) at other processors on behalf of the application during normal mode. In the detached mode, during at least some time interval of an update workflow of the operating system, the application threads are unable to obtain operating system services such as system calls (sometimes referred to as syscalls) from the operating system which is being updated, but may be able to obtain a reduced set of operating system services using a temporary-use replacement set of privileged software in some embodiments. Such temporary-use privileged software may, for example, be made available for execution at the detached-mode processor during preparation operations performed (e.g., by an update manager of the operating system which is going to be updated) prior to the update.

For some types of latency-sensitive applications, operating system functionality may not be required very frequently; for example, user-mode polling drivers may be used predominantly for much of the application's lifetime, or libraries similar to DPDK (Data Plane Development Kit) may be used for fast user-mode packet processing. Furthermore, when required, interactions with the operating system may tend to occur largely during the application's startup phase, after which the application can continue to serve user requests without (much) further assistance from the operating system. Thus, the extent to which an application is able to continue performing its core functions (processing the application users' requests) in detached mode may vary based on the extent to which the application relies on the operating system's services. For at least some important applications such as applications involving some types of virtualization management tasks, the level of ongoing reliance on operating systems may be fairly low during much of the lifecycle of the applications. As such, these types of applications may benefit substantially from the described techniques. In some embodiments in which a latency-sensitive application normally performs both administrative (control-plane) and user-request-processing (data plane) operations, at least a subset of the user-request-processing operations may still be run in detached mode, while at least a subset of the administrative operations may not be possible in the detached mode.

In various embodiments, prior to its update, an operating system may perform a number of preparatory configuration operations to support the detached mode of operation for latency-sensitive applications. At a high level, such operations may set aside or isolate a subset of the computing device's resources such that (a) the resources can continue to be used by the latency-sensitive application while the operating system is updated and hence becomes temporarily unavailable to applications and (b) the resources are in effect temporarily hidden from (or logically detached from) the operating system itself, so that the operating system does not overwrite or re-initialize the resources (e.g., during or shortly after reboot of the updated version of the operating system) while they are being used by the latency-sensitive applications. Such preparatory operations may be performed for a variety of resources in different embodiments, e.g., for a subset of the computing device's processors or cores (which can be used to execute program instructions of the latency-sensitive applications), a subset of the computing device's memory (which can be accessed by the latency-sensitive applications), a set of low-level devices (e.g., represented by respective software "device" data structures within the operating system) and/or other resources. In at least some embodiments, after the preparatory operations are performed, the latency-sensitive application may begin (or continue) using the isolated resources, and the operating system may start a workflow associated with its update. Such an update workflow may include several types of operations in some embodiments, including for example saving state information of the operating system and re-launching/rebooting the operating system using a new version of operating system software (e.g., a set of executable files and associated metadata, downloaded and stored at the computing device earlier). In various embodiments, if there are other less latency-sensitive applications running at the computing device, which can be taken offline for the operating system update while still meeting their performance and responsiveness objectives, the operating system may cause such other applications to exit prior to the period when the operating system becomes unavailable during the update workflow. After the new updated version of the operating system reboots, in at least some embodiments, the latency-sensitive applications may also be caused to exit and then restarted by the newly-updated operating system in normal mode, so that they can once again start submitting any needed requests to the newly-updated operating system and receiving corresponding responses. In at least some embodiments, while a latency-sensitive application or thread may use a particular processor during the detached mode of operation, the application or thread may not necessarily be restricted to continue running on that same processor after the operating system restarts and the application or thread is also restarted. Other applications may also be restarted as needed after the operating system updates itself successfully. Note that in some cases, an operating system update may be accompanied by updates to some or all of the applications running on the computing device—e.g., an updated version of the latency-sensitive application (and/or updated versions of other applications) may be brought online after the operating system's successful update.

As one skilled in the art will appreciate in light of this disclosure, certain embodiments may be capable of achieving various advantages, including some or all of the following: (a) substantially reducing the durations for which at least some types of application programs are unable to respond to user requests, even when the operating systems at the computing devices used for the application programs are being updated, (b) enhancing the user experience of clients and client programs interacting with the applications, e.g., by enabling high levels of responsiveness to user requests regardless of the scheduling of updates, and/or (c) reducing the overall amount of resources used to implement latency-sensitive applications, e.g., by avoiding retries and other repeated processing which may otherwise be required if the applications are unable to process all the requests submitted to them.

According to at least some embodiments, a method may comprise transmitting a request or message to an application running at one or more processors of a computing device with multiple processors from an operating system of the computing device. The message may be sent to prepare the application to enter a detached mode of operation in which the application will be unable to utilize at least some functions of the operating system. Such a message or request may be transmitted after the operating system determines that the operating system is going to be updated, e.g., in response to a notification from, or a communication with, an administrative or control plane component of a network-accessible computing service. The application may be running at one or more processors of the computing device. In some cases the computing device and/or the operating system may support binding of software threads of execution to processors (i.e., ensuring that a given thread runs only at a given processor for at least some period of time); in such embodiments, an application thread may be bound to a particular processor. In other embodiments, such binding may not be utilized. Note that the term "processors" as used herein may refer to a variety of processing hardware elements in different embodiments, which may include CPUs (central processing units), cores, graphics processing units (GPUs), processing elements designed/optimized for specific applications such as machine learning tasks, and so on.

The message/request to prepare for detached mode may be received at the application, and the application may respond by performing one or more preparatory operations (referred to as application-side preparatory operations herein), such as terminating a non-critical thread of the application in various embodiments. Such non-critical threads may, for example, be responsible for metrics collection, logging, and certain types of protocol processing which is not essential to the core functionality of the application. In at least one embodiment, the application may comprise one or more administrative threads as well as one or more request processing threads responsible for fulfilling requests submitted by application clients. In one such embodiment, an administrative thread may receive the operating system's request and/or perform the administrative operations. After the preparatory operations are performed, the application may send an indication to the operating system (e.g., from an administrative thread of the application) that the application is ready to enter the detached mode of operation in various embodiments. Note that in some cases, no threads of the application may have to be terminated as part of the preparation for detached mode operation in at least some embodiments (e.g., if the application does not include any non-critical threads). In at least some embodiments in which an application comprises an administrative thread and a latency-sensitive thread, the administrative thread may also exit before the application enters detached mode. In some embodiments, only applications running with "root" or "administrator" privileges may be permitted to run in detached mode. In some embodiments, an application may not necessarily require a message from the operating system to be received to perform the preparatory operations to enter detached mode; instead, such preparatory operations (if any are required) may be initiated by the application itself.

After the operating system receives an indication that the application is ready for the detached mode, the operating system may respond by performing at least some of the following types of its own preparatory operations to enable the application to run in detached mode in some embodiments. In contrast to the application-side preparatory operations, such operations may be referred to as operating system-side preparatory operations herein. One or more preparatory memory management operations may be performed by the operating system, comprising isolating at least a portion of memory for use (or already in use) by the application, such that the isolated portion remains accessible to the application during the update of the operating system. In at least some embodiments, even though the isolated portion of memory may be modifiable by the operating system after the updated version of the operating system starts running, the updated version of the operating system may not modify or overwrite at least some parts of the isolated portion while the application continues to have access to the isolated portion. Additionally, in at least some embodiments, one or more processor state management operations may be performed with respect to a particular processor of the one or more processors used by the application, including a configuration change such that the particular processor is indicated to the operating system as being in an offline state even though a request processing thread of the application remains running at the particular processor. The processor which remains accessible to the application while appearing to be offline may itself be referred to as running in a detached mode in some embodiments. Thus the "detached mode of operation" terminology may be used herein to refer to both an application's thread(s) (while the threads run but are unable to access services of the operating system which is being updated), and also to processing elements such as processors or cores (while the processing elements appear to be offline to the operating system, and are in this sense detached from the operating system, but are still being used for computations by the application threads). An application or thread running in the detached mode may also be referred to as running in a "headless" mode in some embodiments. Other types of preparatory operations, involving additional aspects of resource management, described in further detail below, may also be performed by the operating system for detached mode in some embodiments.

Having completed its preparatory steps and having determined that the application is ready for detached mode operation, in some embodiments the operating system may send one or more communications or signals that cause the request processing thread to run in user mode on the processor which now appears to be in an offline state. In addition, the operating system may initiate a workflow of an update (e.g., a live update) of itself in various embodiments. The update procedure or workflow may comprise a time interval during which the operating system is unavailable to respond to applications. During the time interval in which the operating system remains unavailable, the request processing thread may perform one or more computations using the apparently-offline or "detached" processor, and may utilize the portion of memory which was earlier isolated for the application by the operating system. In at least some embodiments, the application may continue to use one or more low-level devices (e.g., for whose state information respective data structures are created by the operating system) during the time interval in which the operating system remains unavailable; the low-level devices may not be restarted or re-initialized. In some embodiments, a set of temporary-use privileged mode software may be run at the detached processor, e.g., to enable the application to utilize some kinds of operating system services while the operating system which is being updated remains inaccessible. The temporary-use privileged mode software may be made accessible to the detached-mode processor as a result of a preparatory operation performed by the operating system prior to its update in at least one embodiment. In some embodiments, such temporary-use software may comprise a replacement or temporary-use operating system, which is only used by the application during the update procedure. Such a temporary-use operating system may in some cases provide a different set of functionality than the functionality supported by the operating system which is being updated. In some embodiments, such temporary-use software may comprise an exception handler that mimics some or all of the exception handling functionality of the operating system that is being updated.

Eventually, an updated version of the operating system may be launched during the update procedure or workflow. The updated version may cause the latency-sensitive application to exit; the latency-sensitive application may then be restarted by the updated version of the operating system. In at least some embodiments, the application may save state information prior to exiting (e.g., in response to a request from the operating system), and the use the saved state information to resume the application's operations after the restart. In some cases, at least a subset of the state information of the application may have been generated while the operating system was inaccessible, and may have been stored in the isolated portion of memory designated for the application. After it restarts, the application may issue requests to the (updated) operating system and receive corresponding responses. In some embodiments, after the application which was running in detached mode exits (and before it restarts) the (updated) operating system may utilize CPU hot-plug functionality to change the state of the processor used by the application to "online" state. It is noted that in at least some embodiments the technique described above, which results in reducing the downtime of the application with respect to processing of application requests, may be applied with equal success regardless of whether the update of the operating system is a "live" update (initiated by the operating system itself) or any other type of update (e.g., an update specifically requested/scheduled by an administrator or user of the computing device).

According to at least some embodiments, a system may comprise a plurality of processors and a memory. The memory may comprise program instructions that upon execution implement (a) an operating system and (b) an application running at one or more of the processors. The operating system may perform the kinds of preparatory operations described above (e.g., the memory management operations and the processor state management operations) prior to an update of the operating system. During the update, a request processing thread of the application may continue to perform computations, using a particular processor whose state is indicated as offline to the operating system, and using the isolated portion of memory. After the update of the operating system completes, the application may be restarted in normal mode in at least some embodiments.

According to some embodiments, the preparatory memory management related operations conducted by the operating system may include loading (i.e., bringing into the memory from persistent storage) one or more user mode pages of the application and/or copying one or more page tables to the isolated portion of the memory. In some implementations, kernel page migration features may be used to copy contents of application memory to the isolated portion. For shared pages, copy-on-write operations may be forced by updating virtual memory areas (VMAs) in one implementation. In at least one embodiment, the preparatory operations conducted by the operating system may include configuring an exception vector in the isolated portion of memory to enable handling of exceptions generated from the application while the operating system is inaccessible to the application during the update. In at least one implementation, isolating the portion of memory may comprise marking the portion of memory as a reserved portion in a device tree data structure of the operating system. In some embodiments, one or more operating system kernel drivers may be updated to become aware of detached mode operation, so that corresponding low-level devices (which may be in use by the latency-sensitive application) are not disabled or reset during the operating system update workflow and associated reboots.

In some embodiments, the preparatory processor state management operations performed at or by the operating system may include one or more of: (a) clearing, within one or more data structures, processor state information of the particular processor which is to be used by the request processing thread of the application, (b) storing an indicator that, in response to a request to power off the particular processor from the operating system, the particular processor is not be powered off, or (c) issuing a request to power off the particular processor. In at least one embodiment, a CPU "hot-unplug" or "hot-plug" capability of the operating system may be used to change the apparent state of the particular processor.

The downtime reduction techniques introduced above may be employed at any of a variety of computing devices in different embodiments. In one embodiment, they may be employed at an offload card of a virtualization host used at a virtualized computing service of a provider network. A virtualized computing service can be referred to as an elastic compute service, virtual machine service, computing cloud service, compute engine, or cloud compute service, in various implementations. A provider network may sometimes be referred to as a "public cloud" environment (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network, including hosts at which detached mode is supported, may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region includes two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network, etc.).

The traffic and operations of a cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, and/or system state information). The data plane includes customer resources that are implemented on the cloud provider network (e.g., computing instances, containers, block storage volumes, databases, and/or file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In various embodiments, control plane resources of a provider network (e.g., control plane servers of a virtualized computing service) may orchestrate the downtime reduction techniques described herein, e.g., in scenarios in which operating systems at data plane servers/hosts (such as virtualization hosts of the virtualized computing service) of the provider network. For example, control plane resources may transmit/provide temporary/replacement operating system software to various data plane resources, or program the data plane resources to utilize such temporary-use software, so that the data plane resources become capable of performing operating system updates with minimal or no downtime in at least some embodiments. In various embodiments, the control plane resources may later communicate with the data plane resources to indicate that an update of the operating system needs to be performed. In response to such communications from the control plane, the described techniques involving the use of the detached mode of operation may be implemented at the data plane resources.

In embodiments in which detached mode is used to reduce downtime at an offload card of a virtualization host, the offload card may comprise some number of local processors and a memory. The local processors and memory may be used by a card-level operating system and various virtualization management applications (including one or more latency-sensitive virtualization management applications) which offload a portion of the virtualization management workload (associated with one or more compute instances or virtual machines run at the host) from the primary processors of the virtualization host. In some embodiments, the offload card may be linked to the primary processors of the virtualization host by a peripheral interconnect such as a PCI-E (Peripheral Component Interconnect-Express) bus. In other embodiments, the downtime reduction techniques may be implemented for applications running at the primary processors of a host, e.g., instead of or in addition to being used at peripheral cards. In some embodiments, the orchestration/coordination of the downtime reduction techniques at data plane resources of a provider network may be performed by control plane components of the provider network as described above, regardless of whether the techniques are implemented for latency sensitive applications running at offload cards or primary processors of hosts. In one embodiment, the downtime reduction technique may be used at an Internet-Of-Things (IoT) device, e.g., a sensor device, a voice-driven personal assistant device or the like.

Any of a variety of applications may utilize the detached mode of operation to continue responding to application requests during operating system updates in different embodiments. Such applications may include, among others, (a) a network virtualization management application of a virtualized computing service of a provider network, (b) a storage virtualization management application of a virtualized computing service, or (c) a device emulation application of a virtualized computing service.

In at least one embodiment, a variant of the detached mode of operation introduced above may be implemented. The original technique described above, in which only application threads are run on a logically-detached processor while the operating system updates, may be referred to as a "baseline" detached mode technique. In the variant of the baseline approach, which may be referred to as an "enhanced" detached mode technique, two different kinds of operating systems may be utilized at a multiprocessor computing device: a default or normal mode operating system, and a temporary-use operating system, which can perform at least a subset of the default or normal mode operating system's functions (e.g., some system calls, creating core dumps, etc.). A system call is the programmatic way in which a computer program requests a service from the kernel of the operating system it is executed on. In the enhanced technique, while the normal mode operating system is being updated, and a particular processor used for a latency-sensitive application is logically detached from the system in a manner similar to that described above, the temporary-use operating system may also be run (when needed) on the particular processor being used by the latency-sensitive application.

Example System Environment

FIG. 1 illustrates an example system environment in which a technique involving the use of a detached mode of operation may be implemented to enable some types of application requests to continue to be processed at a computing device during updates of an operating system of the computing device, according to at least some embodiments. As shown, system 100 comprises a computing device 110, of which two views are presented: a hardware view and a software view. In terms of hardware, the computing device 110 may comprise a plurality of processors of a processor set 140, such as processors 120A-120H, and a memory 150 comprising program instructions and data 151 which collectively is used to implement an operating system and a set of applications. In the software view, the computing device comprises the operating system 160 and at least two applications 170A and 170B. The applications 170 may each comprise some number of software threads of execution in the depicted embodiment. Application 170A's threads may be mapped to or run at a subset S1 of the processor set 140, and application 170B's threads may be mapped to a subset S2 of the processor set 140 in the depicted embodiment.

At least one of the applications 170 running at the computing device 110 may comprise one or more latency sensitive threads in the depicted embodiment. A latency sensitive thread may be intended to remain responsive to application requests from application clients, without interruptions to the extent possible, even in unusual scenarios such as during operating system updates. In the example scenario shown in FIG. 1, application 170A comprises a latency-sensitive critical request handling thread 172. Thread 172 may also be described as "critical" in that it is responsible for performing the most important of the application 170's tasks from the perspective of application 170's clients. In addition, application 170A may comprise an administrative thread 171A (e.g., responsible for responding to the operating system 160's requests) and one or more less-critical application threads such as 173A (whose tasks/ responsibilities are less important from application clients' perspective than those of thread 172). Application 170B may comprise an administrative thread 171B as well as one or more less-critical threads such as 173B in the example scenario shown in FIG. 1. Some threads which are not critical and not latency-sensitive may be referred to as non-critical threads or non-latency-sensitive threads in various embodiments.

The operating system 160 may comprise at least an update manager 161, a processor state manager 162, a memory manager 163, a device state manager 164, as well as additional other operating system components 165 in the depicted embodiment. The update manager 161 may be responsible for coordinating the process of updating the operating system, e.g., by detecting when a new version of the operating system code becomes available at a repository, downloading the new version, initiating various preparatory steps for the update followed by the update itself, initiating follow-on operations after the updated version of the operating system has been booted, and so on. The processor state manager 162 may be invoked by the update manager to perform one or more state management tasks for one or more processors of subset S1 (e.g., a processor 120 to be used by the latency-sensitive thread 172 during an update of the operating system). Memory manager 163 may be utilized by update manager 161 to perform one or more memory-related preparatory tasks prior to an update of the operating system 160. In the depicted embodiment, the device state manager 164 may be responsible for ensuring that devices that are being used by the latency-sensitive thread 172 while in detached mode remain usable by the latency-sensitive thread during the update workflow of the operating system, e.g., that such devices are not re-initialized, re-started or reset as part of the update workflow until the application 170A exits as discussed below. Other OS components 165 may perform additional operating system tasks in the depicted embodiment, e.g., including accessing other hardware devices not shown in FIG. 1 such as persistent storage devices and the like on behalf of applications or the operating system itself.

A detached mode of operation may be supported for latency sensitive threads at computing device 110 in the depicted embodiment, enabling requests directed to the latency sensitive threads to continue to be received and processed while the operating system is updated (and hence while the operating system is temporarily inaccessible to handle application requests). The requests may be processed by the latency sensitive thread such as thread 172 using a subset of the computing device resources that have been isolated or set aside prior to the update by the operating system. Note that an operating system 160 may itself comprise a number of hierarchical layers in some embodiments, not shown in FIG. 1, with different layers of the hierarchy responsible for performing some of the tasks being described generically herein as being performed by the operating system (or as being performed by some of the elements shown in FIG. 1).

In at least some embodiments, after the update manager 161 determines that an operating system update (e.g., a "live" update initiated automatically by the operating system itself, without shutting down the computing device 110) is to be performed at the computing device, the update manager 161 may transmit a message or request to the application 170A, indicating that the application should prepare itself to enter a detached mode of operation. In effect, the application 170A may be notified that it (the application) will not be able to access operating system services (e.g., by issuing system calls or the equivalent) for some short time period in the near future. In response to the communication from the update manager 161, the administrative thread 171A of application 170A may perform one or more application-side preparatory steps for the detached mode: for example, the less-critical thread(s) such as 173A of the application may be terminated. The application may inform the update manager 161 that the application is ready for detached mode operation in the depicted embodiment. In one implementation, such a communication may be implemented as the equivalent of an ioctl( ) (input/output control) operation by the application. In at least one embodiment, the administrative thread 171A may inform the operating system (e.g., the update manager) that the application is ready for detached mode, and then the administrative thread may itself exit. In some embodiments, a message or request from the operating system 160 may not be required for the application 170A to initiate the one or more application-side preparatory steps; instead, the application may decide to perform the preparatory steps on its own initiative.

With respect to applications such as 170B which do not comprise latency-sensitive threads, a different approach may be taken by the update manager 161 in at least some embodiments. For example, the application 170B may be sent a message to exit. In response to such a request, in some cases the administrative thread 171B may initiate one or more operations to save application state information to a persistent storage device (not shown in FIG. 1) and then terminate remaining threads of the application 170B (including the less-critical thread 173B and the administrative thread 171B itself). In some implementations, the operating system may send a request to the application 170B to save its state and then exit.

After the update manager 161 receives a communication from the application 170A that the application 170A is prepared to enter a detached mode of operation (or determines using some other approach that the application 170A is ready for detached mode), the update manager may initiate or perform a number of preparatory steps within the operating system itself to enable detached mode operation for the latency-sensitive thread 172 in the depicted embodiment. A set of memory management-related preparatory operations may be initiated, for example, with the help of the memory manager 163. Such memory-related steps may include, for example, isolating at least a portion of memory 150 for use by the application 170A, such that the isolated portion remains accessible to the application 170A while the operating system is updated. In some implementations, such isolation may be implemented at least in part by, for example, marking the portion of memory as "reserved" in a device tree data structure accessible from the operating system. In various embodiments, the operating system may ensure (e.g., using the "reserved" configuration setting or some other configuration setting) that the updated version of the operating system is made aware that the isolated portion of memory was being used by the application 170A during the update, so that the updated version refrains from modifying, re-initializing or overwriting memory that continues to be used by the application 170A. A number of other memory-related preparatory operations may be performed at this stage in some embodiments, such as for example faulting in one or more user mode pages of the application 170A into the memory (so as to avoid/reduce page faults during the time period in which the operating system is going to be inaccessible) and/or copying one or more page tables for use on behalf of the application 170A to the isolated portion of memory. As a result of copying the page tables, virtual memory translations on behalf of the application 170A may be processed from the isolate memory portion in various embodiments. In at least one embodiment, as part of the preparatory operations, an exception vector may be set up or configured in the isolated portion of memory to enable handling of exceptions/errors generated at or encountered at application 170A while the operating system is inaccessible. In one embodiment, as part of the preparatory operations, the update manager 161 or some other component of the operating system may enable a set of privileged mode software such as a temporary-use operating system (whose functionality may differ from that of the operating system being updated) to be executed as needed on behalf of application 170A at the detached processor during the update of the operating system. Program instructions for such privileged mode software (including, for example, instructions accessed via an exception vector of the kind mentioned above) may be loaded into the isolated portion of memory in such an embodiment, for example. In effect, the operating system may take such preparatory actions in various embodiments to enable at least a few essential operating system kernel functions to be performed for the application 170A using the subset of resources set aside for the detached mode of operation of application 170A, while the operating system's functionality is unavailable due to the update.

In addition to the memory related preparatory operations, one or more processor related preparatory operations may also be initiated by the update manager 161 prior to the actual update of the operating system in the depicted embodiment. Some of the processor related preparatory operations may comprise storing an indication in a data structure which indicates to the operating system that a particular processor 120 (the one to be used by the thread 172 during the update) is offline or "detached", despite the fact that the processor is in fact being used by the thread 172 during the update. In at least some embodiments, a CPU hot-unplug feature of the operating system may be employed (e.g., by the processor state manager 162 at the behalf of the update manager 161) as part of the procedure to set the processor's apparent state to offline. In some implementations, for example, a terminate signal may be sent to the application 172, but the signal may be processed within the operating system kernel and may never be allowed to reach the user mode; instead, signal processing components may save thread 172's register context and inform the CPU hot-unplug components to take the processor used by thread 172 offline. A number of lower-level operations regarding the state of the processor which is targeted for use by thread 172 during the operating system update may be performed in some embodiments, e.g., including (a) clearing processor state information of that particular processor in one or more data structures, (b) storing an indicator that, in response to a request to power off the particular processor from the operating system, the particular processor is in fact not be powered off, or (c) issuing a request to power off the particular processor. In some implementations in which processors 120 implement a version of the ARM® architecture, for example, the ARM® Power State Coordination Interface (PSCI) may be used to issue the request to power off the processor. Instead of actually powering off the processor in response to such a request, the portion of the operating system or firmware responsible for power-related operations may check to see whether the processor is to be used for detached mode execution of the application 170A, and if so, the processor will be prepared to resume the execution of thread 172 in various embodiments. This may involve updating a pointer to the exception vector associated with the processor, as well as page table pointers, and jumping back to user mode in some implementations. From the perspective of the operating system kernel, the processor may be indicated as offline after this point even though it is actually in use by thread 172 for user-mode processing of application requests.

After the preparatory steps have been completed by the operating system (as well as the application 172), the update manager may initiate the update of the operating system 160. During at least some time period of the update procedure or workflow, the operating system 160 may remain unavailable to application threads (including thread 172 which may be running using the detached processor, and may perform various computations using the reserved portion of memory as well as low-level devices which continue to be accessible to thread 172 due to configuration operations initiated by the device state manager 164.) After the updated version of the operating system is successfully booted, in at least some embodiments the newly-updated version may cause various applications (including applications 170A and 170B) to exit, and then restart the applications in normal mode. For example, one or more signals or other types of messages may be sent to the applications to cause them to exit. In one implementation, the updated version of the operating system may write to a particular location within the isolated portion of memory to cause application 170A to exit. In normal mode, after the applications are restarted, they may send requests of various kinds to the update operating system and receive corresponding responses for those requests which require responses. The restart of the application 170A may be completed very quickly after application 170A exits, as the application 170A may not have to wait for other entities like the operating system to also be rebooted (as is the case in some traditional update procedures); as a result, the responsiveness of the application 170A to its clients' application request may only be affected for a very short time. In at least some embodiments, the latency-sensitive thread 172 may be first thread (or among the first threads) of application 170A to be restarted, to ensure that a minimum delay is encountered by application requests.

Update-Related Event Sequences with and without Detached Mode Support

Figure 2:
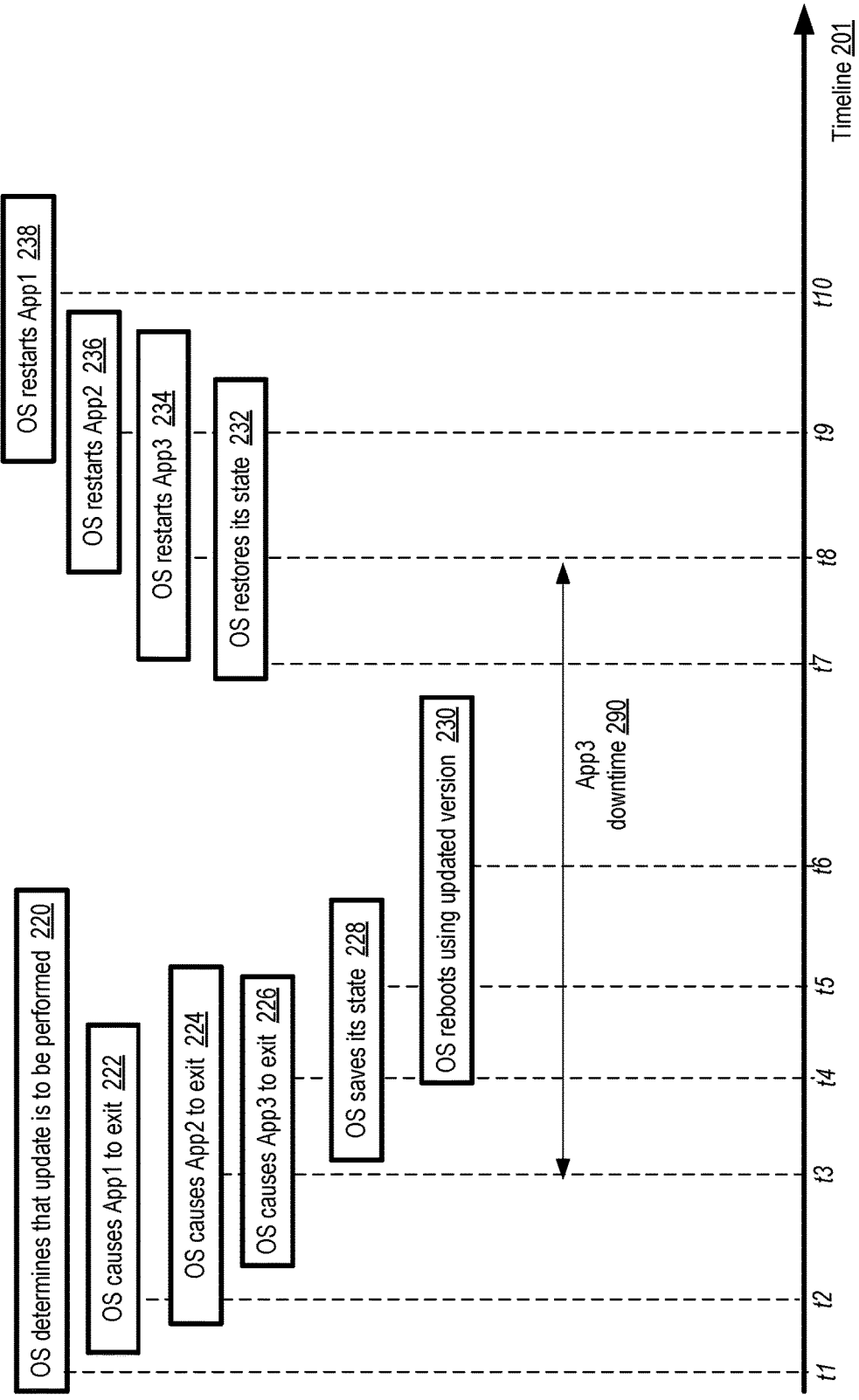
FIG. 2 illustrates an example overview of a sequence of events which may occur when an operating system is to be updated at a system at which a detached mode of operation is not supported, according to at least some embodiments.

To illustrate the benefits of the use of the techniques introduced above, it may be helpful to show example sequences of events associated with operating system updates at a given computing device, first in a scenario in which the detached mode of operation is not supported or utilized, and then in a scenario in which the detached mode is supported and utilized. FIG. 2 illustrates an example overview of a sequence of events which may occur when an operating system is to be updated at a system at which a detached mode of operation is not supported, according to at least some embodiments. Along with an operating system, three applications (App1, App2 and App3) are assumed to be running at a computing device with multiple processors. Application App3 is assumed to be critical and also latency-sensitive—e.g., at least one of App3's software threads performs essential tasks (from the perspective of the clients or users of App3) in response to application requests, and App3's objectives include keeping such software threads up and running continuously if at all possible. At time t1 along timeline 201, the operating system detects or determines that an update of the operating system is to be performed, as indicated in element 220. The operating system then causes each of the applications in turn to exit. In some cases, some or all of the applications may save respective application state information prior to exiting, so that the applications can be restarted cleanly and resume their operations using the saved state information after the update. Because App3 is more latency-sensitive than the other applications, the operating system decides to keep App3 running as long as possible—e.g., App1 and App2 are caused to exit before App3.

At time t2, the operating system causes App1 to exit, as indicated in element 222. Then, at time t3, the operating system causes App2 to exit, as indicated in element 224. At time t4, the operating system causes App3 to exit, as indicated in element 226. After this, at time t4, the operating system saves its own state information (element 228). At time t5, the operating system reboots using the update version of the operating system software, as shown in element 230.

The operating system restores its state information at time t7 (element 232), and then causes each of the applications to be restarted, in reverse order to the order in which the applications exited earlier. Thus, at time t8, the operating system causes App3 to be restarted (element 234); the latency-sensitive application request processing tasks may now be resumed by App3. At time t9 and t10 respectively, applications App2 and App1 are restarted as indicated by elements 236 and 238, thus restoring all the applications to their initial level of functionality. The latency-sensitive application App3 has to remain unavailable for the time period between t3 and t8 in the depicted example scenario. Note that the actual durations between the times t1, t2, t10 may vary substantially based on the specific computing device and operating system being used. The key point illustrated in FIG. 2 is that in the depicted scenario in which detached mode operation is not used, a latency-sensitive application such as App3 may have to remain unresponsive for at least the time it takes for the operating system to update itself.

Figure 3:
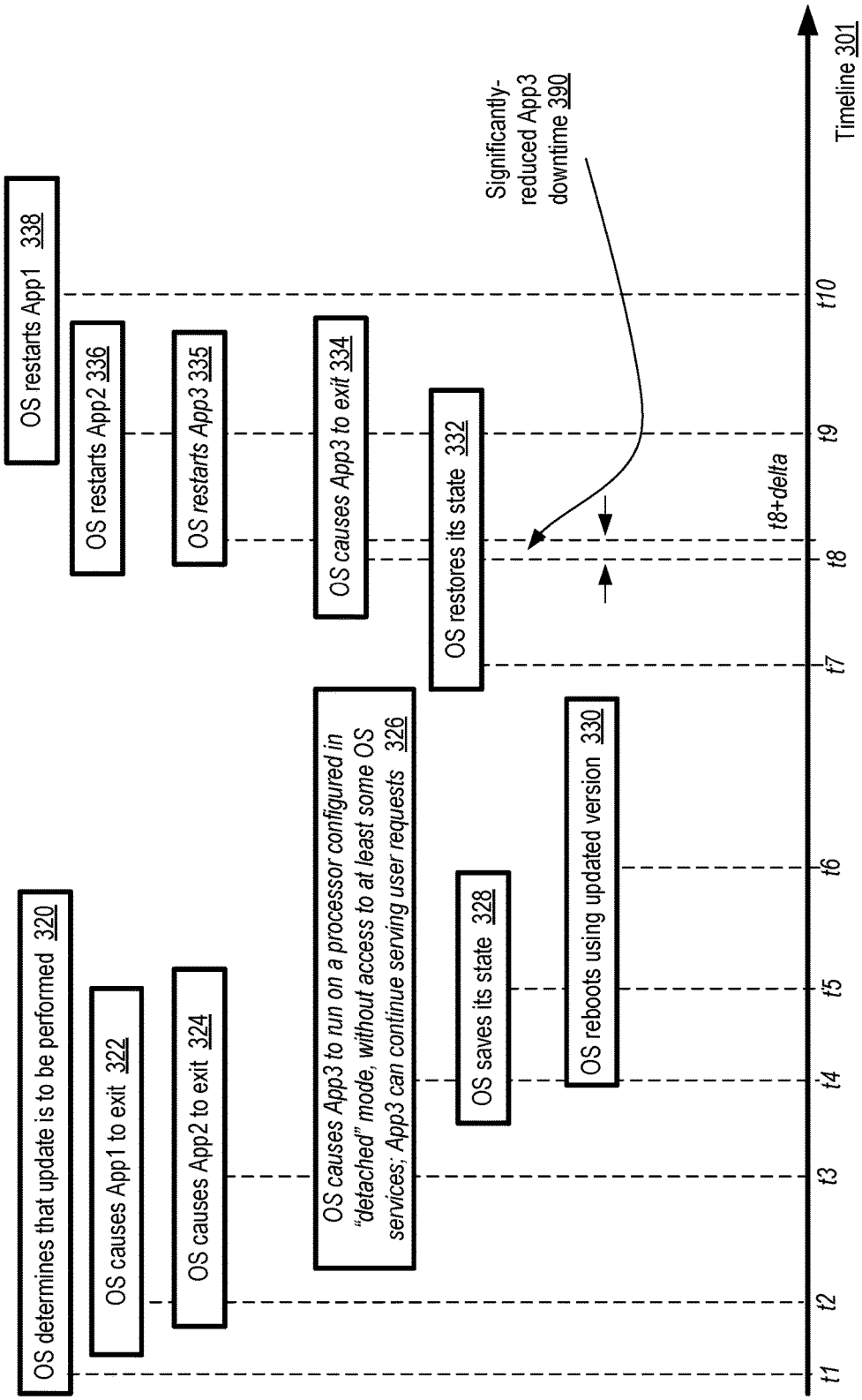
FIG. 3 illustrates example overview of a sequence of events which may occur when an operating system is to be updated at a system at which a detached mode of operation is supported, according to at least some embodiments.

FIG. 3 illustrates example overview of a sequence of events which may occur when an operating system is to be updated at a system at which a detached mode of operation is supported, according to at least some embodiments. The same assumptions hold with regard to the applications: App3 is assumed to be the most latency sensitive among the three applications.

Events at times t1, t2, t3, t5, t6, t7, t9 and t10 along timeline 301 (represented by elements 320, 322, 324, 328, 330, 332, 336 and 338 respectively) are logical equivalents to the events at times t1, t2, t3, t5, t6, t7, t9 and t10 of timeline 201 of FIG. 2. With respect to the less latency-sensitive applications App1 and App2, the operating system performs the same kind of operations as were performed in the scenario depicted in FIG. 2—each of these two applications is caused to exit, and is restarted after the operating system reboots from its updated version and restores the operating system's own state.

With respect to the latency-sensitive application App3, however, the operating system now uses a different approach from that employed in the scenario shown in FIG. 2. Instead of causing App3 to exit at time t4, the operating system causes App3 to run on a processor (or processors, depending on how many threads of App3 need to run concurrently) configured in "detached" mode, without access to at least a subset of the services of the operating system itself. App3 can continue to serve user requests while running on the processor, although it may not be able to use the operating system itself for at least part of the time between t4 and t7 in the depicted example scenario. After the operating system has rebooted using its updated version at time t6, and restored its state at time t7, the operating system may send a message or signal to the still-running App3 to exit (element 334) at time t8. (As discussed in the context of FIG. 2, applications App1, App2 and/or App3 may save state information prior to their respective exits in some cases). In at least some embodiments, the operating system may be modified in such a way that after the OS reboots (e.g., at t6) the processors being used in detached mode are not interrupted, and their state is not modified, until after the OS has restored its state (at t7). At time (t8+delta), i.e., very shortly after App3 exits, the OS may cause App3 to be restarted in normal mode in the depicted embodiment. In normal mode, App3 may again have access to all of the operating system's services (in contrast to the detached mode, when at least a subset of the operating system's services/functions may be unavailable). As such, the amount of App3 downtime 390 (time during which App3 is unable to respond to application requests from its users or clients) may be reduced significantly in the depicted embodiment relative to the scenario depicted in FIG. 2 as a result of using the detached mode of operation.

Example Behavior of Applications During Operating System Updates

Figure 4:
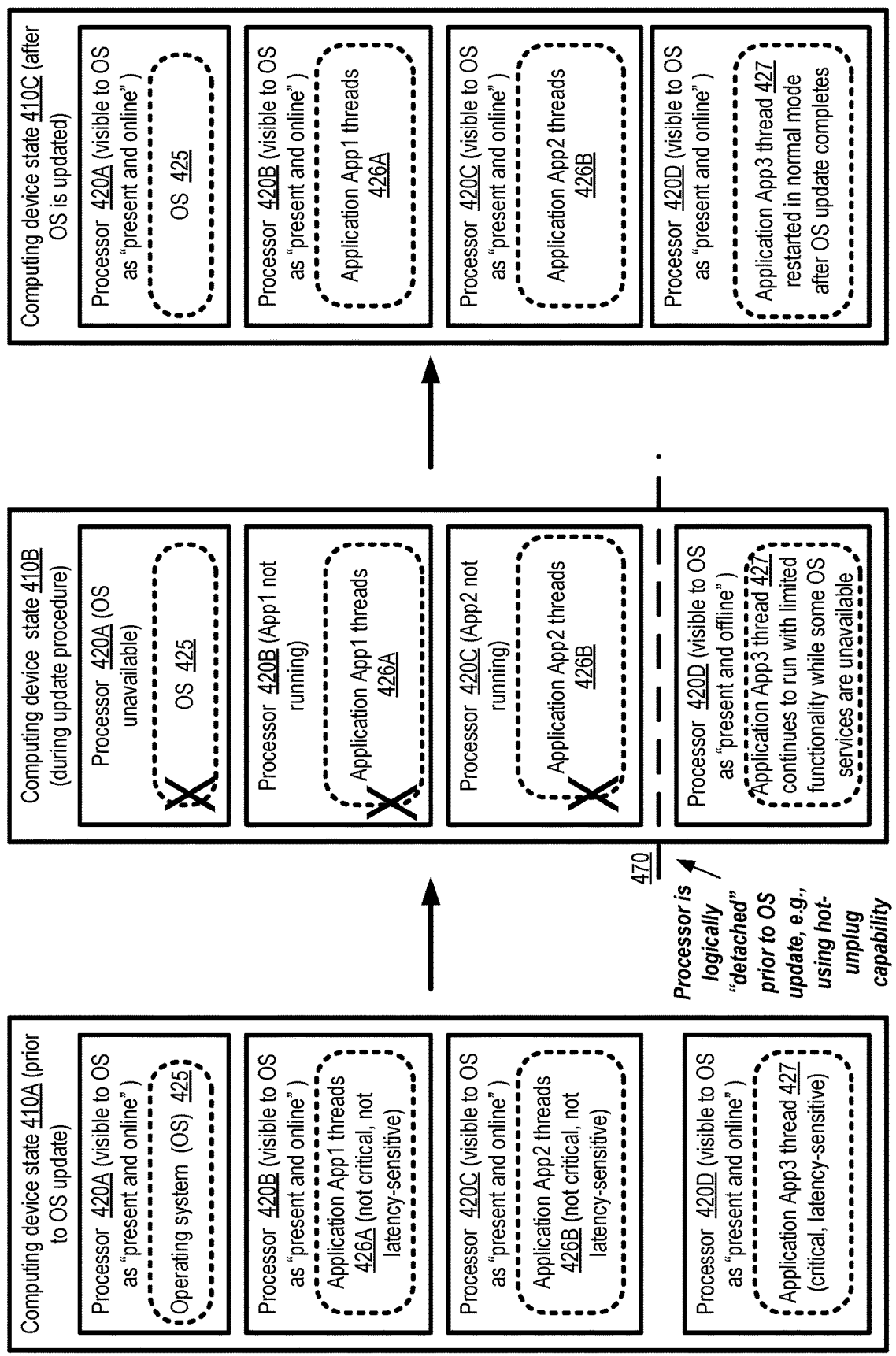
FIG. 4 illustrates a high-level overview of example changes in states of processors, applications and operating systems during an implementation of an update procedure, according to at least some embodiments.

FIG. 4 illustrates a high-level overview of example changes in states of processors, applications and operating systems during an implementation of an update procedure, according to at least some embodiments. Three states of the operating system and applications running at a computing device state are shown: state 410A, prior to the scheduling of an operating system update; state 410B, at a point of time during the update procedure; and state 410C, after the operating system has been updated and the updated version has become accessible to the applications.

In state 410A, all the processors of the computing device, such as 420A, 420B, 420C and 420D, may be indicated as being present and online in a processor status data structure visible to the operating system. In the example shown in FIG. 4, at least a portion of the functionality of the operating system may be implemented using processor 420A. Respective sets one or more threads of applications App1, App2 and App3 may run at processors 420B, 420C and 420D. App1 threads 426A and App2 threads 426B may not be latency sensitive or critical, while a particular App3 thread 427 may be critical and latency sensitive in the depicted embodiment.

As indicated symbolically by the dashed line 470, processor 420A's state may be changed (e.g., as part of a set of preparatory operations performed prior to an update by the operating system) to "present and offline" in the processor status data structure shortly before the operating system gets updated. This state change may be referred to as logically detaching the processor 420D from the rest of the processors of the computing device. During the time period in which processor 420D remains detached, App3 thread 427 may continue to run at the processor 420D, with slightly reduced functionality because at least some services of the operating system may not be accessible to thread 427 in the depicted embodiment. In some embodiments, the operating system may utilize CPU hot-unplug and/or CPU hot-plug features built in to the operating system, to change the state of processor 420D from "present and online" and "present and offline" and vice versa. Generally speaking, such CPU hot-plug and hot-unplug features may enable processors to be dynamically brought online and dynamically taken offline as desired, without shutting the system down. Setting the state of processor 420D to offline may ensure that processor 420D's state information is not overwritten during the update procedure in at least some embodiments; because the processor is considered offline from the perspective of the rebooted new version of the operating system, its state information may not have to be changed. During at least some portion of the update procedure, the operating system 425, as well as threads 426A and 426B of App1 and App2 may all be terminated, as indicated in computing device state 410B.

After the operating system is successfully updated, as indicated in state 410C, all four processors 420A-420D may re-enter the "present and online" state in the depicted embodiment. In at least one embodiment, the processors 420B and 420C may both be restarted in a normal mode of operation (as opposed to a detached mode) by default as part of the overall update procedure, e.g., after the new version of the operating system is brought up on processor 420A. In some embodiments, after the operating system has been updated and the new version of the operating system has started, the updated operating system may send a signal or communication to the application App3 to exit, so that it too can be restarted in normal mode in at least some embodiments. In order to cause such a communication to be sent, information indicating that the processor 420D was placed in detached mode prior to the update may be stored in a data structure visible to the updated operating system in at least some embodiments, and such a data structure may be examined by the updated operating system as part of an initial set of post-update operations. In the normal mode, all the applications may issue service requests to the operating system (and receive corresponding responses if needed) in the depicted embodiment.

Methods for Utilizing Detached Mode Operation to Reduce Application Downtime

Figure 5:
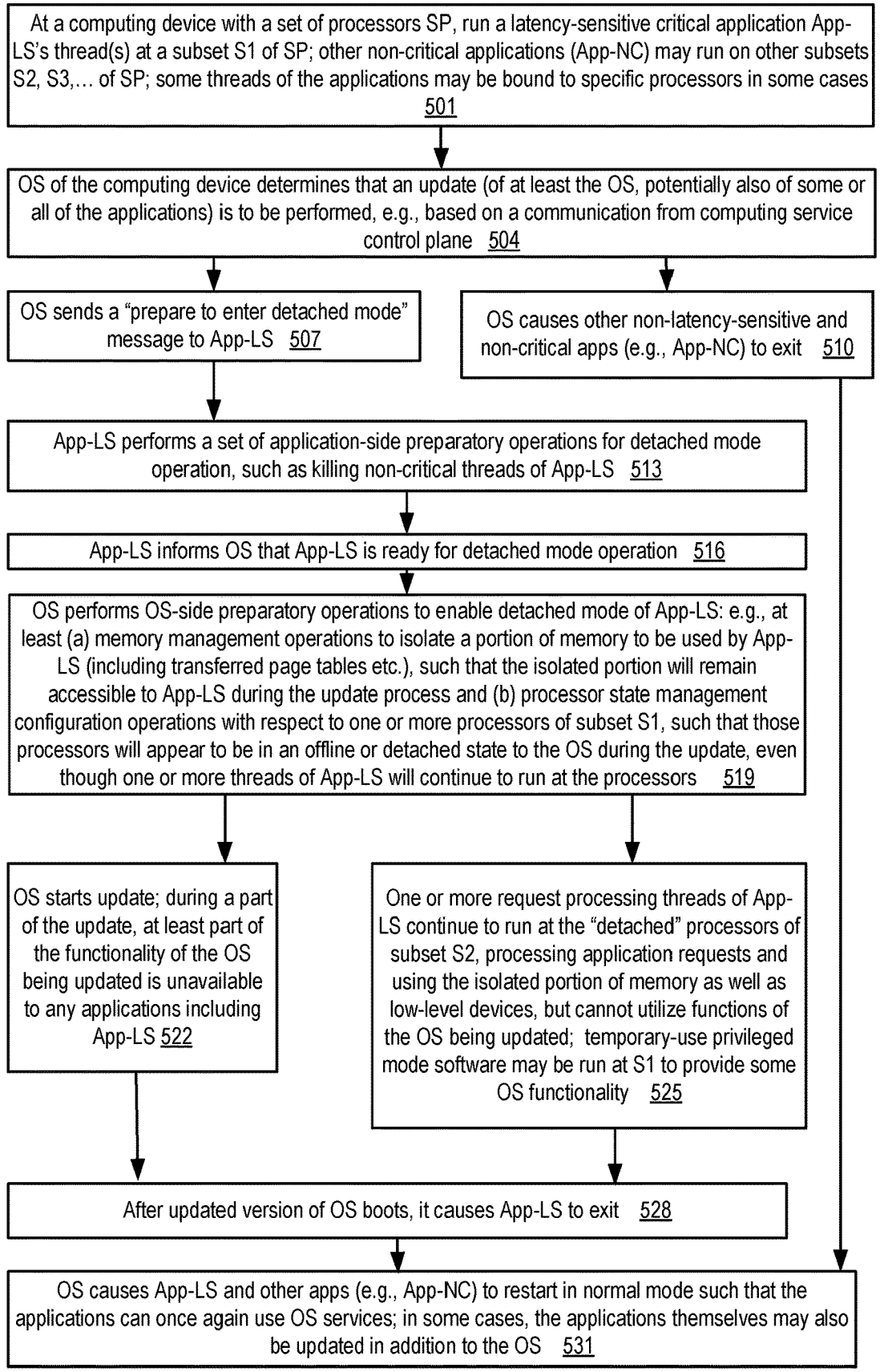
FIG. 5 is a flow diagram illustrating aspects of operations that may be performed to reduce the down-time of applications using a detached mode of operation during operating system updates, according to at least some embodiments.

FIG. 5 is a flow diagram illustrating aspects of operations that may be performed to reduce the down-time of applications using a detached mode of operation during operating system updates, according to at least some embodiments. As shown in element 501, a computing device comprising a set of processors SP may be used to run one or more applications. In the depicted embodiment, a latency-sensitive critical application App-LS may be run at a subset S1 of SP. Other, less critical and/or less latency-sensitive applications (such as referred to as App-NC) may be run at other subsets S2, S3, etc., of SP in some embodiments; in other embodiments, there may not be any applications other than App-LS running at the computing device. In addition to the application(s), an operating system may also run at the computing device in the depicted embodiment.

The OS may determine, e.g., based on communications with a control plane or administrative portion of a computing service of which the computing device is a part, that an update of at least the OS is to be performed at the computing device (element 504). In some cases, the update may involve not just starting up a new version of the operating system, but also new versions of one or more of the applications; in other cases, only the application may be updated. Executable filed for the to-be-updated software may be downloaded to storage devices accessible from the computing device in various embodiments, e.g., from one or more repositories. In at least some embodiments, the update may be considered a "live" update in that the operating system may be responsible for automating the process of detecting that the update is to be performed, implementing various preparatory tasks such as downloading new software versions, and rebooting itself with the new version.

The treatment of applications by the OS with respect to the update may differ in the depicted embodiment based on whether the applications are latency-sensitive and critical, or not. For those applications which are deemed to be less latency sensitive and/or non-critical (such as App-NC), the operating system may request that the applications exit (element 510). For the latency-sensitive application App-LS, the OS may send the logical equivalent of a "prepare to enter detached mode" message or request (element 507) in some embodiments. In some implementations, operating system signal functionality and/or events that the application is registered to detect may be used for the request. In some embodiments, the OS may maintain a list of latency-sensitive applications, or a data structure which indicates which applications (if any) are latency sensitive and as a result require special treatment during updates.

Two kinds of preparatory steps for detached mode operation of a latency-sensitive application such as App-LS may be performed in some embodiments: a first kind performed by the latency-sensitive application, and a second kind performed by the OS. In response to receiving the "prepare to enter detached mode" message, App-LS may perform one or more application-side preparatory steps in the depicted embodiment (element 513). For example, if App-LS includes any non-critical threads (i.e., threads which do not have to remain running during the operating system's update procedure), such threads may be killed or terminated (e.g., after saving their respective state information). After completing the application-side preparatory steps, App-LS may inform the OS, e.g., via the equivalent of an ioctl( ) system call, that it (App-LS) is ready to enter detached mode operation in the depicted embodiment (element 516). In other embodiments, such an explicit message back to the OS may not be required; instead, for example, the OS may be able to detect when the number of running threads of App-LS stops decreasing, indicating that the application-side preparatory steps have been completed. In some embodiments, App-LS may initiate at least some preparatory steps for detached mode operation on its own, i.e., without being explicitly requested to do so by the operating system.

In various embodiments, the OS may perform a set of OS-side preparatory operations (the second kind of preparatory step mentioned above) to enable successful detached mode operation of App-LS (element 519). Such OS-side preparatory operations may include, for example, a set of memory management operations which isolate a portion of memory for use by App-LS in detached mode. In various embodiments, configuration settings of the memory portion may be set such that the after the updated OS restarts, the updated OS is able to detect that the memory portion is in use by App-LS, and so the updated OS does not overwrite or re-initialize the memory portion. In one embodiment, the memory portion may be marked as "reserved" in a device tree data structure. Some number of user-mode pages may be loaded or faulted into memory in one embodiment on behalf of App-LS, and/or copies of one or more page tables to be used by App-LS during the detached mode of operation may be copied to the isolated memory portion in at least one embodiment. In some embodiments, an exception vector may be created and stored in the reserved portion of memory to enable handling of exceptions/errors generated from App-LS while the operating system is inaccessible during the update. In at least one embodiment, as part of the preparatory steps, a set of privileged mode software (such as a temporary-use operating system variant) may be loaded into the memory portion set aside for use by App-LS, so that at least some operating system services can be used by App-LS during detached mode operation. In various embodiments, a set of processor-state related OS-side preparatory steps may also be performed. For example, the state information for one or more processors of subset S1 (the ones being used by App-LS) may be set (using one or more configuration operations) in such a way that those processors appear to be offline to the OS, even though they are actually being used by one or more of the App-LS threads. Other OS-side preparation steps may also or instead be undertaken in some embodiments, such as modifying configuration settings for some low-level devices so that the devices can continue to be used by App-LS in detached mode without being restarted or re-initialized.

After the OS-side preparatory steps are complete, the OS may start its update (element 522) in the depicted embodiment. For some time during the update, at least some of the functionality of the OS which is being updated may become unavailable/inaccessible from any application including App-LS. One or more request processing threads of App-LS may continue to run computations at the "detached" processor(s) of subset S1 during such time periods in at least some embodiments, and may continue to perform such computations to process application requests for App-LS using the isolated portion of memory and a set of low-level devices (without requiring the low-level devices to be restarted or re-initialized) (element 525). However, App-LS may of course be unable to access some OS services or functions during at least part of the update, and as such may not be able to perform some tasks that require the cooperation or participation of the OS. In some embodiments, as mentioned above, temporary-use privileged mode software may be run at the processors of subset S1 to provide at least some level of OS services to App-LS in detached mode.

After the updated version of the OS boots up as part of the update, in the depicted embodiment it may cause App-LS to exit (element 528). In at least some embodiments, App-LS may save its state information (some of which may have been generated during the time that the OS was unavailable) prior to exiting. The OS may cause App-LS and any other apps (which had exited earlier), such as App-NC, to restart in normal mode. In normal mode, the applications may freely use OS services—e.g., they may send requests to the updated OS and receive corresponding requests/responses as needed (element 531). In some cases, one or more of the applications may also be updated along with the OS—that is, just as a new version of the OS may be run, respective new versions of one or more of the applications may also be run after they restart.

In at least some embodiments, there may be multiple latency-sensitive applications running at the computing device, and such applications may be treated similarly to App-LS—e.g., respective latency-sensitive applications App-LS1, App-LS2 etc., may each be permitted to use a respective processor in detached mode during the update of the OS, so that they may all continue to serve respective clients/users with minimal downtime during the OS update.

It is noted that in various embodiments, some of the operations shown in FIG. 5 may be implemented in a different order than that shown in the figure, or may be performed in parallel rather than sequentially. Additionally, some of the operations shown in FIG. 5 may not be required in one or more implementations.

Example Changes in Application Thread State During Updates

Figure 6:
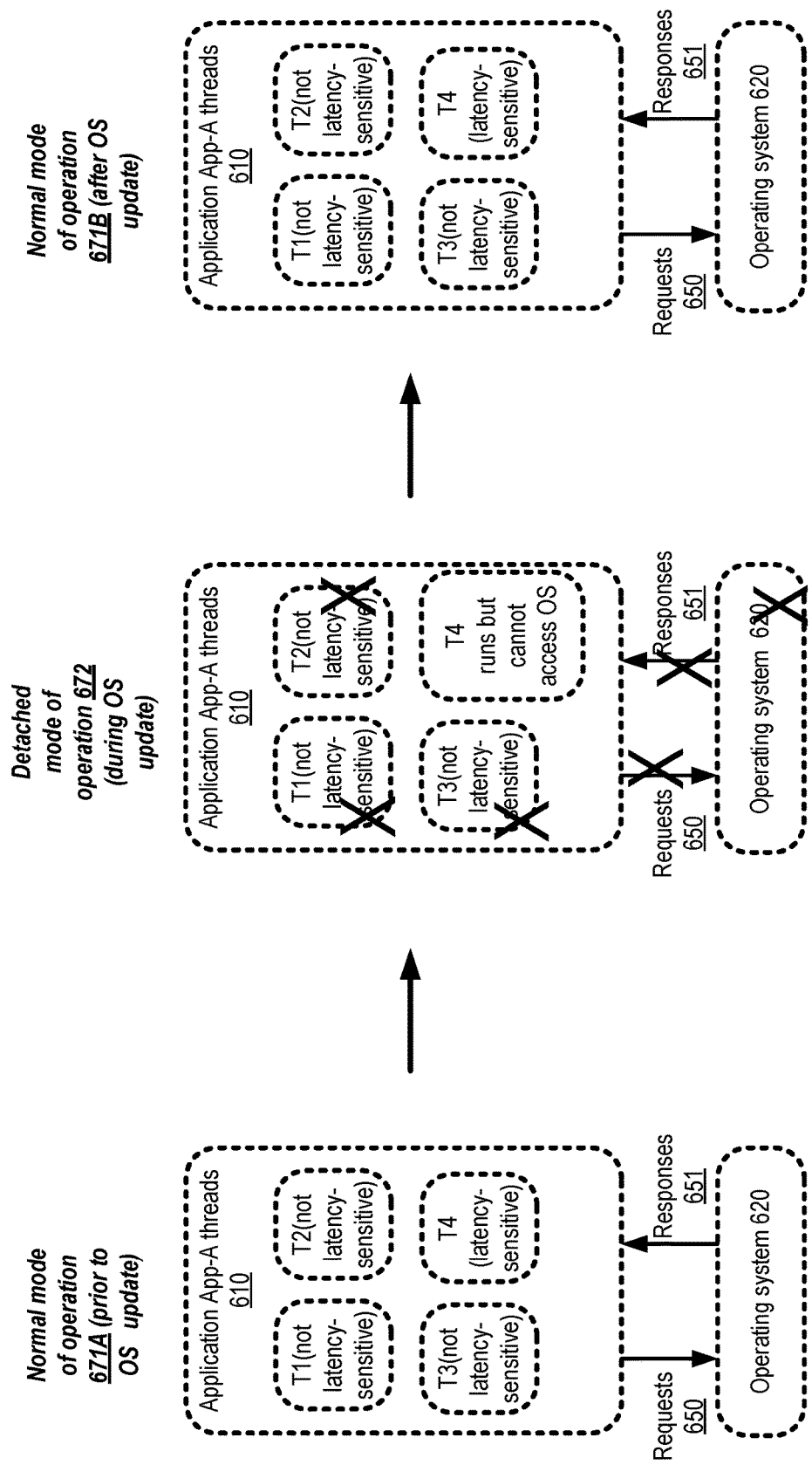
FIG. 6 is a high-level overview of example changes in application thread status and operating system accessibility status during an update of the operating system, according to at least some embodiments.

FIG. 6 illustrates a high-level overview of example changes in application thread status and operating system accessibility status during an update of the operating system, according to at least some embodiments. In a normal mode of operation 671A prior to an OS update at a computing device, an application App-A may comprise a plurality of running software threads 610, including threads T1, T2, T3 and T4. T1, T2 and T3 may not be latency sensitive in the depicted example scenario, while T4 may be latency-sensitive. Each of the four threads may submit service requests 650 to operating system 620, and receive responses 651 in those cases in which the requests result in responses (some OS requests may not require explicit responses).

During at least a portion of an OS update procedure, the application App-A may run in a detached mode 672 (e.g., using one or more processors which have been placed in detached mode by the OS prior to the update) in the depicted embodiment. During at least some of the time that App-A runs in detached mode, the OS 620 may not be accessible, and the non-latency-sensitive application threads such as T1 T2 and T3 may remain terminated in the depicted embodiment. In contrast, latency-sensitive thread T4 may continue to run, but may not be able to access at least some services and functionality of the OS which is being updated in the depicted embodiment. In at least one implementation, if T4 attempts or issues a system call during the detached mode, T4 may be terminated. In other implementations, an intermediary layer of software (called a system call "shim") may be introduced to intercept and block system calls being made by applications during detached mode, so that such "illegal" or undesired calls are ignored instead of causing the thread T4 to exit.

After the OS is updated, all the software threads may resume normal execution in the depicted embodiment, as shown in normal mode of operation 671B. Threads T1, T2, T3 and T4 may all be restarted and interact with the OS 620 as and when needed.

Example Isolation of Memory Portion

Figure 7:
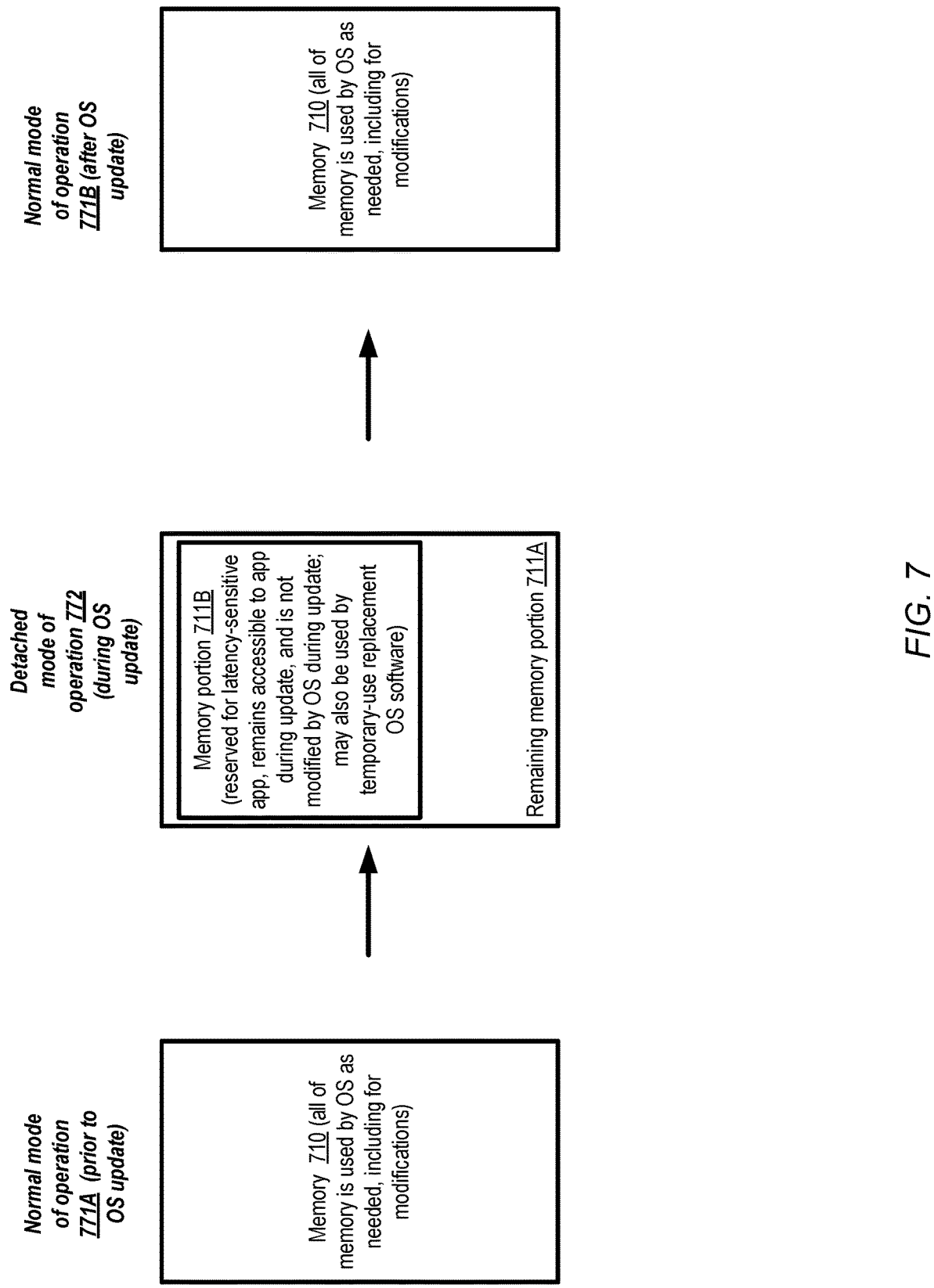
FIG. 7 illustrates a high-level overview of example changes in memory state during an update of an operating system, according to at least some embodiments.

FIG. 7 illustrates a high-level overview of example changes in memory state during an update of an operating system, according to at least some embodiments. In a normal mode of operation 771A prior to an OS update at a computing device, all of the memory (e.g., main memory) of the computing device may be used by the operating system as needed, including for performing various types of writes or modifications.

During a detached mode of operation 772 of at least one application thread (e.g., a latency-sensitive application thread) at the computing device, while at least a portion of the OS update procedure is implemented, one portion 711B of the memory may be reserved for the exclusive use of the detached mode latency-sensitive application in the depicted embodiment. The portion 711B may, for example, be designated as a "reserved" portion of memory in a device tree or similar data structure. Even though the operating system (e.g., after it reboots using the updated version) is able to write to the portion 711B, portion 711B may not be modified by the restarting (updated) operating system in some embodiments, thus allowing the latency-sensitive application to continue using portion 711B for its computations. The remaining portion 711A of memory may be accessible to and, as needed, modified by the operating system during and after the reboot of the updated version of the OS in the depicted embodiment. The isolation of the portion 711B may ensure that the latency-sensitive application can continue to perform at least some types of memory operations while the OS is updated, and can thus continue to serve application requests. In some embodiments, the isolated portion of memory 711B may be used for and by a temporary-use replacement operating system during the detached mode operation of the latency-sensitive application.

After the OS is updated, a normal mode of operation 711B may be resumed with respect to the memory in the depicted embodiment. All the memory 710 may again be accessible to (and may be modified as needed by) the OS, just as it was before the update.

Example Changes in Application Debugging Capabilities

Figure 8:
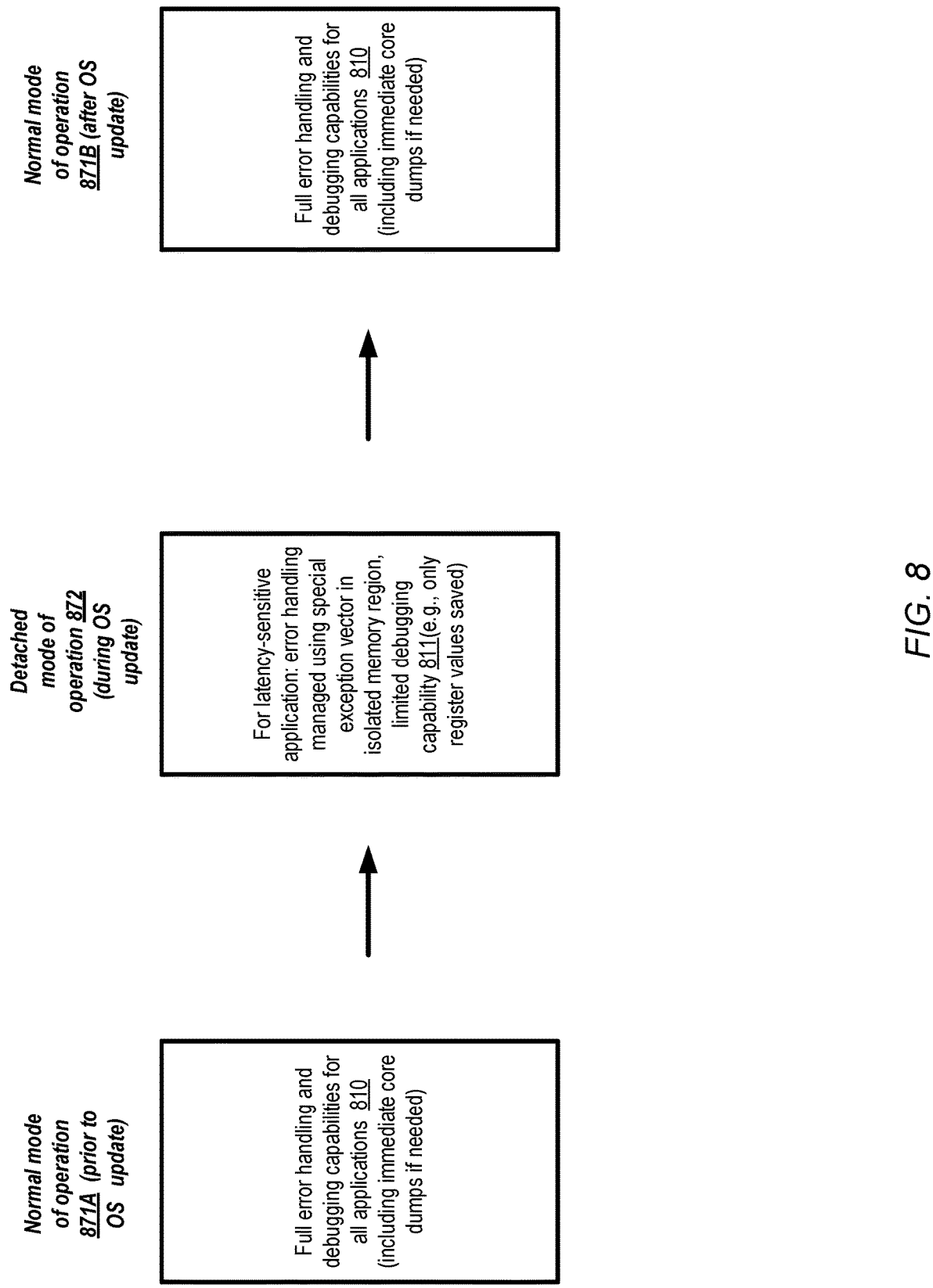
FIG. 8 illustrates a high-level overview of example changes in application error handling and debugging functionality during an update of an operating system, according to at least some embodiments.

FIG. 8 illustrates a high-level overview of example changes in application error handling and debugging functionality during an update of an operating system, according to at least some embodiments. Prior to the update of the operating system, during normal mode of operation 871A, full error handling and debugging capabilities 810 may be available for all applications, including immediate core dump generation capabilities which may be used to capture the state of the memory being used by the applications at the time of an error-induced (or user-induced) application crash.

During the time interval in which a latency sensitive application runs in the detached mode of operation 872, and the operating system is updated, applications which are not latency-sensitive and hence are not allowed to continue running may be offline, so no error handling/debugging may be required for them. However, for the latency-sensitive application whose request handling threads continue to run, at least some level of error handling may be supported, e.g., using an exception vector written to the isolated version of memory in the depicted embodiment. Immediate core dumping capability may be unavailable (core dumps may be deferred until the operating system becomes accessible), but values stored in registers being used by the latency-sensitive application may be captured and stored in the event that the application crashes or exits due to an error (e.g., to help with determining what caused the error); as such, debugging capability for the latency-sensitive application may be available but somewhat limited. If an application exits while running in detached mode, in some embodiments the contents of the exception vector may cause an exception handler to power off the processor being used after the register contents are captured. In at least some embodiments, if the application exits while in detached mode, the application may be debugged when the (updated) operating system becomes accessible—e.g., contents of the isolated portion of the memory which were being used by the application when it exited may be saved in a core dump, a debugger may be attached, and so on.

After the OS is updated, a normal mode of operation 871B may be resumed with respect to the error handling and debugging functionality for all applications in the depicted embodiment. For example, core dumps containing application state information may be created immediately at application exit time if desired, or at any other time if requested by an application user. Note that in some embodiments in which a temporary-use operating system is used while the latency-sensitive application runs in detached mode, generating immediate core dumps and/or other error handling functionality may be supported by the temporary-use operating system.

Example Virtualization Host with Offloading Card

In some embodiments, the application downtime reduction techniques introduced above may be employed at one or more network-accessible services of a provider network or cloud computing environment, including for example a virtualized computing service. Clients of the virtualized computing service may be provided access to compute instances (such as guest virtual machines or bare-metal instances) established at a fleet of virtualization hosts of the service. The clients may then run applications of their choice at the compute instances.

Figure 9:
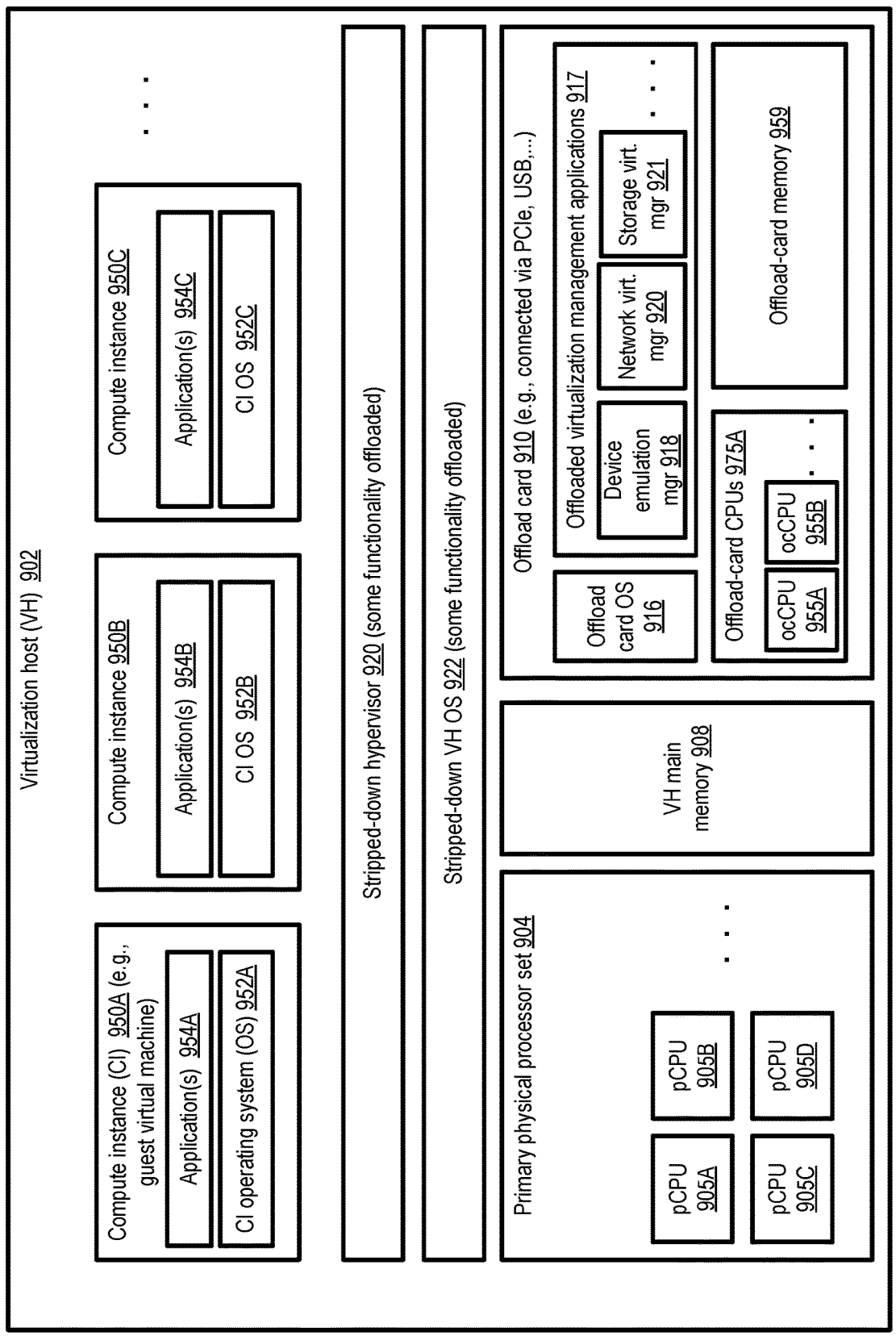
FIG. 9 illustrates an example virtualization host at which detached-mode operation may be used to enable some virtualization management applications to continue service requests during updates, according to at least some embodiments.

FIG. 9 illustrates an example virtualization host at which detached-mode operation may be used to enable some virtualization management applications to continue service requests during updates, according to at least some embodiments. As shown, virtualization host (VH) 902 comprises a set of primary physical processors 904, including primary CPUs (pCPUs) 905A, 905B, 905C and 905D as well as a main memory 908 in the depicted embodiment. The primary physical processor set 904 and the VH main memory 908 may be used by a stripped-down virtualization host operating system (VH OS) 922, a stripped-down hypervisor 920, as well as various compute instances (CIs) 950 (e.g., 950A, 950B, or 950C) set up on behalf of clients of a virtualized computing service at the virtualization host. The VH OS 922 and the hypervisor 920 may be referred to as being "stripped-down" because a portion of their respective functions may be offloaded to programs running at an offload card 910 in the depicted embodiment. As a result of such offloading, a larger fraction of the computing power of the primary physical processor set 904 may become available for compute instance 950 in the depicted embodiment than in some other approaches towards virtualization, in effect reducing the overhead of virtualization management imposed on the resources that could be used on behalf of clients of the virtualized computing service.

In some embodiments, an offload card 910 may be connected via a peripheral interconnect to the primary processor set 904 of the virtualization host. For example, in some implementations, PCIe (Peripheral Component Interconnect-Express) may be used, while in other implementations USB (Universal Serial Bus) or other types of interconnects may be used. The offload card 910 may include a set of local offload-card CPUs 975 (referred to as ocCPUs), such as ocCPU 955A and 955B in the depicted embodiment, as well as offload-card memory 959. The program instructions executed to implement an offload card operating system 916, as well as a set of offloaded virtualization management applications 917 may be stored in the memory 959. The offloaded virtualization management applications may include, for example, a device emulation manager 918, a network virtualization manager 920, and/or a storage virtualization manager 921 in the depicted embodiment. Several different types of devices (e.g., peripheral devices etc.) may be emulated for the compute instances 950 by the device emulation manager 918 in the depicted embodiment. Various aspects of network traffic management (including, for example, the implementation of encapsulation protocols and the like) may be handled by network virtualization manager 920 in the depicted embodiment. The storage virtualization manager 921 may enable the compute instances to access one or more virtualized storage volumes and/or other types of storage devices (e.g., local storage devices, and/or remote network-accessed storage devices) in at least some embodiments. In some embodiments, the offload card may include a virtualization controller (not shown in FIG. 9) which may be responsible for orchestrating a secure boot procedure of the virtualization host 902.

In the embodiment shown in FIG. 9, one or more of the offloaded virtualization management applications 917 may be latency-sensitive, and may therefore be allowed to continue running at respective ocCPUs 955A while the offload card OS 916 is updated using the downtime reduction techniques introduced above. For a given latency-sensitive offloaded virtualization management application, for example, a portion of memory 959 may be isolated. Similarly, state information for the ocCPU 955 to be used for a given application 917 may be changed such that the ocCPU appears to be offline during at least a portion of the update procedure for OS 916, even though at least one thread of the application 917 continues to run at the ocCPU 955. As a result of ensuring that the virtualization management applications 917 continue to be responsive to requests during updates to the offload card OS, at least some of the applications run at the compute instances 950 set up on behalf of virtualized computing service clients may also continue to run without problems or interruptions during such updates in the depicted embodiment. In some embodiments, multiple offload cards 910 may be attached to a given virtualization host 902, and the detached mode of operation may be implemented at some or all of the offload cards. The offload cards may include a number of additional components in various embodiments which are not shown in FIG. 9, such as trusted computing module (TPMs), power management components, and so on.

In at least one embodiment, the detached mode of operation may be supported at the primary physical processor set 904 of a virtualization host 902, e.g., in addition to or instead of being implemented at the offload card 910. The VH operating system 922 may enable one or more latency-sensitive threads of the stripped-down hypervisor 920 to continue to run in detached mode at respective pCPUs 905 while the VH operating system is updated, for example. Each of the compute instances 950, e.g., 950A, 950B, 950C and the like may also include a compute instance operating system 952 (e.g., 952A, 952B and 950C) as well as a set of applications 954 (e.g., 954A, 954B and 954C). In at least one implementation, a compute instance-level application 954 may be able to continue to use a virtualized CPU (in a detached mode, without access to the corresponding CI operating system 952) assigned to the application 954 by the hypervisor 920 while the CI operating system 952 is updated. In at least one embodiment, the detached mode of operation and the associated application downtime reduction techniques may be implemented at several different levels on the same virtualization host 902 or other similar computing devices, e.g., at the ocCPUs 955 of an offload card 910 as well as at the primary physical CPUs 905.

In some embodiments, a tool such as a detached mode suitability analyzer may be implemented, e.g., at a provider network, to examine the extent of dependency of various applications on operating systems. A client may use such a tool to request that a particular application of interest be examined during normal operating periods, to determine whether the application would be able to work effectively without operating system support (or with a limited subset of operating system services). The tool may, for example, analyze operation records (such as system call logs, traces, etc.) of the application which are generated and stored at a computing service, and provide an indication of suitability of the application for operation in detached mode. Based on the suitability of the application, the client may decide to make changes to the application (e.g., to add support for application-side preparation steps for detached mode of the kind discussed earlier, or to reduce the number of system calls made from the application) and then deploy the application for use in detached mode as needed during updates of the operating system.

Use Cases

The techniques described above, of reducing application downtime associated with operating system updates may be useful in a variety of scenarios. Many applications have stringent performance and availability requirements, especially in scenarios in which higher-level applications depend on the responsiveness of such applications to achieve their own (the higher-level applications') service objectives. By allowing at least some threads of such performance-sensitive applications to continue running during periods of operating system updates at computing devices of various types including virtualization hosts of provider network environments, the potential impact of update-related operating system unavailability on end-user application performance may be minimized or eliminated.

Illustrative Computer System

Figure 10:
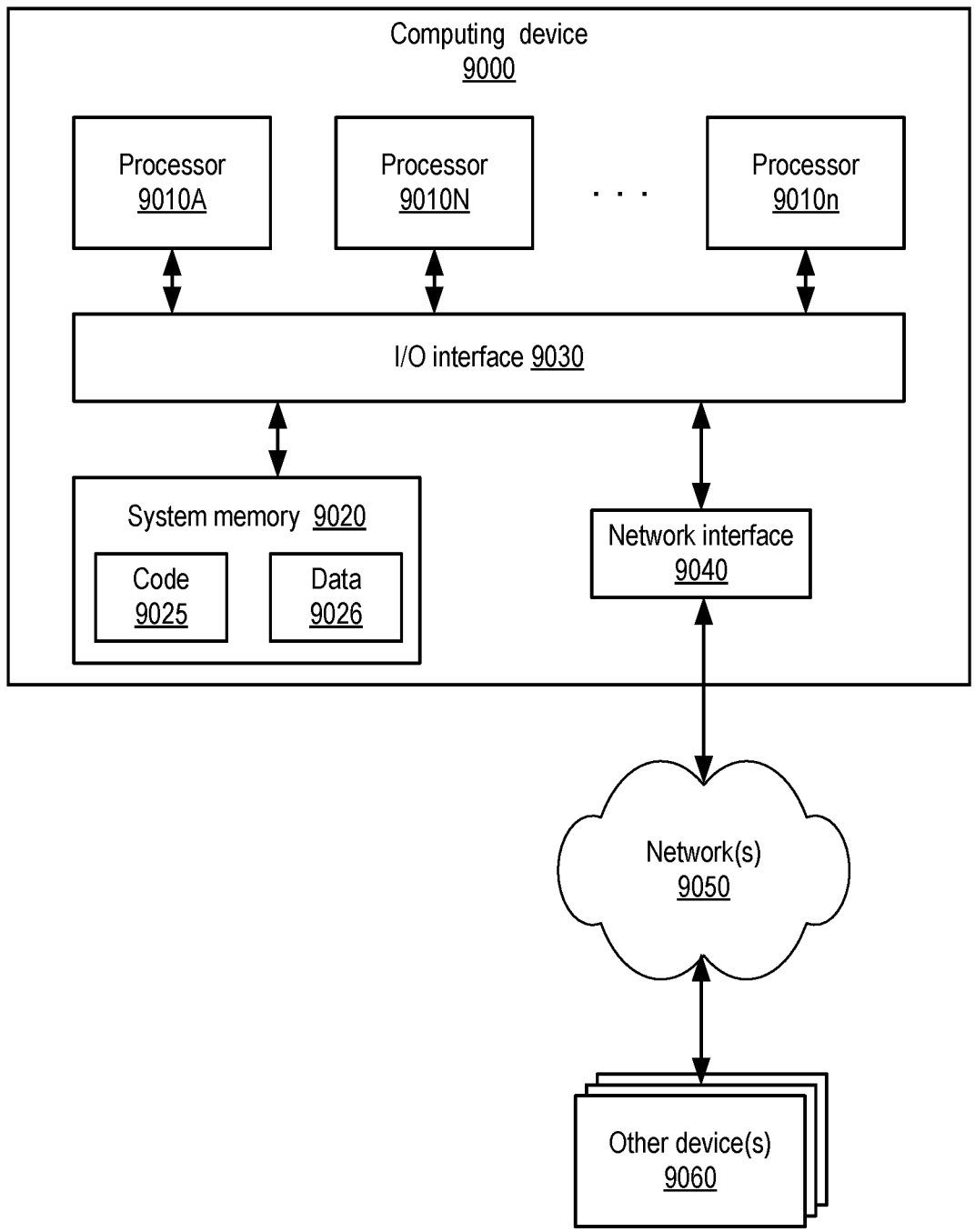
FIG. 10 is a block diagram illustrating an example computing device that may be used in at least some embodiments.

In at least some embodiments, the application downtime reduction techniques described above may be implemented at a general-purpose computer system that includes or is configured to access one or more computer-accessible media. FIG. 10 illustrates such a general-purpose computing device 9000. In the illustrated embodiment, computing device 9000 includes several processors 9010 (e.g., 9010A, 9010B, etc.) coupled to a system memory 9020 (which may comprise both non-volatile and volatile memory modules) via an input/output (I/O) interface 9030. Computing device 9000 further includes a network interface 9040 coupled to I/O interface 9030.

Processors 9010 may be any suitable processors or cores capable of executing instructions. For example, in various embodiments, processors 9010 may be general-purpose or embedded processors implementing any of a variety of instruction set architectures (ISAs), such as the x86, PowerPC, SPARC, ARM®, RiscV, or MIPS ISAs, or any other suitable ISA. Each of processors 9010 may commonly, but not necessarily, implement the same ISA. In some implementations, graphics processing units (GPUs) may be used instead of, or in addition to, conventional processors.

System memory 9020 may be configured to store instructions and data accessible by processors 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processors 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A method, comprising:
    transmitting, by an operating system of a computing device comprising a plurality of processors, prior to an update of the operating system, a request to an application running at one or more processors of the computing device, to prepare the application to enter a detached mode of operation in which the application will be unable to utilize at least some functions of the operating system, wherein the one or more processors on which the application is running include a particular processor;

performing, by the application, one or more preparatory operations for the detached mode, including terminating a non-critical thread of the application;

sending, by the application to the operating system, an indication that the application is ready for the detached mode;

performing, by the operating system in response to the indication: (a) one or more memory management operations comprising isolating at least a portion of memory used by the application, such that the isolated portion remains accessible to the application during an update of the operating system and (b) one or more processor state management operations with respect to the particular processor, such that the particular processor is indicated to the operating system as being in an offline state while a request processing thread of the application remains running at the particular processor;

initiating, by the operating system, an update workflow of the operating system after the one or more memory management operations and the one or more processor state management operations are completed, wherein the update workflow comprises a time interval during which at least some functionality of the operating system is unavailable;

performing, by the request processing thread using the particular processor during the time interval, one or more computations in response to one or more application requests, wherein performing the one or more computations comprises utilizing the isolated portion of memory and one or more low-level devices, without restarting the low-level devices;

causing, by an updated version of the operating system which is launched during the update workflow, the application to exit; and causing, by the updated version of the operating system, the application to be restarted, wherein after the application is restarted, one or more threads of the restarted application issue a respective request to the operating system and receive corresponding responses.

2. The method as recited in claim 1, wherein the one or more memory management operations comprise one or more of: (a) loading one or more user mode pages of the application into the isolated portion of memory or (b) copying one or more page tables to the isolated portion of memory.

3. The method as recited in claim 1, further comprising:
prior to the update, setting up an exception vector in the isolated portion of memory by the operating system to enable handling of errors generated at the application while at least some functionality of the operating system is inaccessible to the application.

4. The method as recited in claim 1, wherein isolating the portion of memory comprises marking the portion of memory as a reserved portion in a data structure.

5. The method as recited in claim 1, further comprising:
causing a temporary-use operating system to run at the particular processor during at least a portion of the time interval.

6. A system, comprising:
a plurality of processors; and
a memory;
wherein the memory includes instructions that upon execution implement (a) an operating system and (b) an application running at one or more processors of the plurality of processors;

wherein the operating system is configured to:
perform (a) one or more memory management operations comprising isolating at least a portion of the memory used by the application, such that the isolated portion remains accessible to the application during an update of the operating system and (b) one or more processor management operations with respect to a particular processor of the one or more processors, such that the particular processor is indicated to the operating system as being in an offline state while the application remains running at the particular processor;

initiate an update of at least the operating system, wherein the update comprises a time interval during which (a) at least some functionality of the operating system is unavailable and (b) the application performs one or more computations at the particular processor in response to one or more application requests; and cause the application to be restarted after a boot of an updated version of the operating system.

7. The system as recited in claim 6, wherein the operating system is further configured to:
transmit, prior to the update, a request to the application to prepare the application to enter a detached mode in which the application will be unable to utilize at least some functions of the operating system.

8. The system as recited in claim 6, wherein the application comprises one or more administrative threads and at least one non-critical thread, wherein the one or more administrative threads are configured to:
perform, prior to the update, one or more operations to prepare the application to enter a detached mode of operation in which the application will be unable to utilize at least some functions of the operating system, wherein the one or more operations include terminating the non-critical thread.

9. The system as recited in claim 6, wherein the one or more memory management operations comprise one or more of: (a) loading one or more user mode pages of the application or (b) copying one or more page tables to the isolated portion of memory.

10. The system as recited in claim 6, wherein the operating system is further configured to:
prior to the update, set up an exception vector in the isolated portion of memory to enable handling of errors generated from the application while at least some functionality of the operating system is inaccessible to the application.

11. The system as recited in claim 6, wherein isolating the portion of memory comprises marking the portion of memory as a reserved portion in a data structure.

12. The system as recited in claim 6, wherein the one or more processor management operations comprise one or more of: (a) clearing processor state information of the particular processor in one or more data structures, (b) storing an indicator that, in response to a request to power off the particular processor from the operating system, the particular processor is not be powered off, or (c) issuing a request to power off the particular processor.

13. The system as recited in claim 6, wherein the one or more processor management operations comprise utilizing a CPU-unplug functionality of the operating system.

14. The system as recited in claim 6, wherein at least one processor of the plurality of processors is incorporated within an offload card of a host, wherein the offload card is configured to perform one or more virtualization management operations for one or more compute instances launched at the host.

15. The system as recited in claim 6, wherein the application comprises one or more of: (a) a network virtualization management application of a virtualized computing service (b) a storage virtualization management application of a virtualized computing service, or (c) a device emulation application of a virtualized computing service.

16. One or more non-transitory computer-accessible storage media storing program instructions that when executed on or across one or more processors:
   perform, prior to an update of an operating system, one or more configuration operations with respect to a particular processor of the one or more processors, such that the particular processor is indicated to the operating system as being in an offline state while an application remains running at the particular processor;
   initiate an update of at least the operating system, wherein the update comprises a time interval during which (a) the operating system is unavailable and (b) the application performs one or more computations at the particular processor; and
   cause the application to be restarted after a boot of an updated version of the operating system.

17. The one or more non-transitory computer-accessible storage media as recited in claim 16, storing further program instructions that when executed on or across the one or more processors:
   isolate, prior to the update of the operating system, at least a portion of memory used by the application, such that the isolated portion remains accessible to the application while the operating system is updated.

18. The one or more non-transitory computer-accessible storage media as recited in claim 16, storing further program instructions that when executed on or across the one or more processors:
   load, prior to the update of the operating system, one or more user mode pages of the application into a portion of memory isolated for the application.

19. The one or more non-transitory computer-accessible storage media as recited in claim 16, storing further program instructions that when executed on or across the one or more processors:
   copy, prior to the update of the operating system, one or more page tables to a portion of memory isolated for the application.

20. The system as recited in claim 6, wherein the operating system is further configured to:
   set up, prior to the update, an exception vector in an isolated portion of memory accessible to the application during the update.

* * * * *